United States Patent

Ishitani et al.

[15] 3,658,534

[45] Apr. 25, 1972

[54] PHOTOSENSITIVE POLYMERIC MATERIAL AND METHOD FOR THE PREPARATION THEREOF

[72] Inventors: Akira Ishitani; Kenkichi Nukada, both of Kamakura-shi, Japan

[73] Assignee: Toray Industries, Inc.

[22] Filed: Sept. 12, 1969

[21] Appl. No.: 857,534

[30] Foreign Application Priority Data

Sept. 16, 1968 Japan ....................43/66223
Oct. 30, 1968 Japan ....................43/78536

[52] U.S. Cl. ....................96/48 R, 96/88, 96/92, 96/115 R, 117/34, 204/159.18, 204/159.24

[51] Int. Cl. ....................G03c 1/64, G03c 5/24

[58] Field of Search ....................96/48, 88, 92, 115 R; 260/75 T, 861; 204/159.18, 159.24; 117/34

[56] References Cited

UNITED STATES PATENTS

| | | | |
|---|---|---|---|
| 2,504,593 | 4/1950 | Schoen | 96/48 |
| 2,789,053 | 4/1957 | Elliot | 96/48 |
| 2,905,554 | 9/1959 | Fuchsman et al. | 96/48 |
| 3,147,117 | 9/1964 | Wainer et al. | 96/48 |
| 3,244,519 | 4/1966 | Schwerin | 96/115 P |
| 3,259,495 | 7/1966 | Schlein | 96/48 |
| 3,377,169 | 4/1968 | Blake | 96/48 |

*Primary Examiner*—John T. Goolkasian
*Assistant Examiner*—George W. Moxon, II
*Attorney*—Paul & Paul

[57] ABSTRACT

A photosensitive polymeric material comprising an oxygen, sulfur, phosphorus, nitrogen, halogen or coordination compound forming aromatic nucleus-containing polymer bonded by coordination bonding to an organic or inorganic salt of a metal from Groups IB, IIB, VIB, VIIB, and VIIIB of the Periodic Table. Typically, nylon or a polyester film is immersed in a solution of a metal salt, such as cupric halide, to effect molecular dispersion thereof on said polymer and formation of a coordination bonded complex therebetween. Numerous other polymers, metal compounds and dispersion-bonding methods are also disclosed. Color or absorptivity change is then produced by irradiation. Some of the complexed polymer materials are heat sensitive and/or reversible in their photo and heat sensitivity. Color changes may be fixed in some materials after irradiation by other treatment steps. Selective treatment with chemical reagents or dyestuffs is also possible following irradiation.

15 Claims, No Drawings

PHOTOSENSITIVE POLYMERIC MATERIAL AND METHOD FOR THE PREPARATION THEREOF

The present invention relates to a novel photosensitive material. More particularly, the invention relates to a photosensitive material of a new type which may exhibit a change of color (visible) or change of absorptivity in a band outside the visible spectrum in response to light (i.e., near infrared, visible or ultraviolet irradiation).

Many inorganic materials have been known as color changing photosensitive materials. Some of these materials have been used in the reproduction art and some are photochromic, i.e., reversibly photosensitive. Usually, however, these materials comprise a photosensitive material such as silver bromide or an oxide of a transition metal dispersed in solid state in a polymer matrix. With these photosensitive materials, variation of color is limited. Because the resolving power of these materials depends upon the size of the dispersed particles, resolution to the molecular size cannot be expected at all.

As a result of strenuous study with a view to developing a material, particularly film, which per se exhibits photosensitiveness and a resolving power of molecular dimensions, the present inventors have arrived at the present invention which comprises such a material and a process for imparting photosensitiveness to a synthetic polymer which may be already shaped or which thereafter can be readily shaped.

The photosensitive material of the present invention comprises a synthetic polymer having at least 0.1 percent by weight based on the polymer weight of a salt of a metal of Group IB, IIB, VIB, VIIB, or VIIIB of the Periodic Table bonded to oxygen atom, sulfur atom, phosphorus atom, nitrogen atom, halogen atom or an aromatic nucleus in the polymer molecule by coordination bonds. This photosensitive material undergoes an absorptivity change when irradiated, which change can thereafter be fixed by a proper aftertreatment.

As a synthetic polymer used in the present invention, any synthetic polymer having in the polymer molecule an atom of oxygen, sulfur, phosphorus, nitrogen, halogen or an aromatic nucleus having coordination capacity may be used. These atoms or nucleus can exist in the polymer molecule in the form of, for example, C=O, —CONR—, —COO—, —OH, —CONRR', —O—, —COOR, —Cl, —F, —Br, —CN, —OCONR—, —NRCO—NR—,

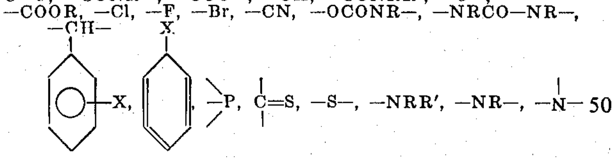

(wherein R, R' are H or organic groups and X is a halogen). That there is no particular form in which these atoms must occur in the polymer should be understood from the fact that the functional effect of the present invention depends upon the coordination bonding of these atoms to metal ions.

As specific examples of such synthetic polymers, there are polyamides, represented, for example, by nylon-4, -6, -6.6, -6.10 and -12, polyesters, represented, for example, by polyethylene terephthalate and polyethylene sebacate, polyvinyl alcohol, phenol resin, polyurethane resin, polyacrylamide, polyoxymethylene, polymethacrylic acid, methyl polymethacrylate, polyvinyl acetate, polyvinyl chloride, polystyrene, polyacrylonitrile, urea resin, melamine resin, vinylon and ABS resin.

As a metal salt, any salt (compound) of copper, silver, gold, zinc, cadmium, mercury, chromium, molybdenum, tungsten, manganese, technetium, rhenium, iron, cobalt, nickel, ruthenium, rhodium, palladium, osmium, iridium and platinum is essentially usable. For example, there are inorganic salts such as halide, sulfide, cyanate, nitrate, sulfate, sulfite, arsenate, arsenite, carbonate, phosphate, thiocyanate, thiosulfate, chromate, bichromate and perchlorate of these metals and organic salts such as acetate, propionate, benzoate, oxalate, tartrate, butyrate, succinate, fumarate, citrate and terephthalate, of these metals. Further, complex salts and double salts such as ammine complex salt, ethylene diamine complex salt, dipyridyl complex salt, dimethylglyoxime complex salt, cyan complex salt and aquocomplex of these metals may also be used.

Examples of specific compounds which may be used include (Roman numerals indicate valence state of metal) inorganic salts such as copper (I, II) chloride, silver chloride, gold chloride, zinc chloride, cadmium chloride, mercury (II) chloride, copper (I, II) bromide, silver bromide, gold bromide, zinc bromide, cadmium bromide, mercury (II) bromide, copper (I) iodide, silver iodide, gold iodide, zinc iodide, cadmium iodide, mercury (II) iodide, silver sulfide, gold sulfide, zinc sulfide, copper (I, II) cyanate, silver cyanate, gold cyanate, zinc cyanate, mercury (II) cyanate, copper (I) nitrate, silver nitrate, zinc nitrate, cadmium nitrate, mercury (II) nitrate, copper (II) sulfate, silver sulfate, zinc sulfate, cadmium sulfate, mercury (II) sulfate, silver sulfite, silver arsenate, copper (I) arsenite, gold arsenite, copper (I) carbonate, silver carbonate, zinc carbonate, cadmium carbonate, mercury (I) carbonate and silver phosphate, organic salts such as copper (II) acetate, silver acetate, gold acetate, mercury (II) acetate, copper (II) benzoate, silver benzoate, gold oxalate, mercury (II) oxalate, copper (II) tartrate, silver succinate, mercury (II) fumarate, copper (II) terephthalate and silver terephthalate, and complex salts such as tatraammine copper (II) sulfate, monoethylenediamine copper (II) sulfate, diethylenediamine copper (II) sulfate, monopyridyl copper (II) nitrate, bisdipyridyl copper (II) nitrate, tatracyano copper (I) acid potassium, bis (acetylacetonate) copper (II), dicyanosilver acid potassium, dicyanogold (I) acid potassium, tetracyano gold (III) acid potassium, tetrahydrooxogold (III) acid potassium, tetrachlorogold (III) acid, tetracyanocadmium acid potassium and diaminesilver chloride. Other inorganic salts which may be used include chromium (II, III) chloride, molybdenum (V) chloride, manganese (II, IV), chloride, iron (II, III) chloride, cobalt (II, III) chloride, nickel (II) chloride, chromium (III) bromide hexahydrate, manganese (II) bromide, iron (II, III) bromide, cobalt (II) bromide, nickel (II) bromide, chromium (III) iodide, manganese (II) iodide, iron (II) iodide, cobalt (II) iodide, nickel (II) iodide, chromium (II, III) sulfide, chromium (II, III) nitrate, manganese (II) nitrate, iron (II, III) nitrate, cobalt (II) nitrate, nickel (II) nitrate, chromium (II, III) sulfate, manganese (II) sulfate, iron (II, III) sulfate, cobalt (II) sulfate, nickel (II) sulfate, iron (II) arsenate, iron (II) carbonate, cobalt (II) carbonate, manganese (II) phosphate, cobalt (II) silicate, cobalt (II) chromate, iron (III) bichromate, manganese (II) perchlorate, iron (II) perchlorate, cobalt (II) perchlorate, and nickel (II) perchlorate, Organic salts may also be used. Examples of such salts include chromium (II, III) acetate, manganese (II, IV) acetate, iron (II, III) acetate, cobalt (II, III) acetate, nickel (II) acetate, iron (II, III) benzoate, iron (II, III) oxalate, cobalt (II, III) oxalate, iron (II, III) tartrate, cobalt (II, III) tartrate, iron (II, III) succinate, iron (II, III) fumarate, iron (II, III) terephthalate, and cobalt (II, III) terephthalate and complex salts such as hexaaquochromium (III) chloride, hexaammine chromium (III) chloride, hexacyanochromium (III) acid potassium, chromium (III) sulfate ammonium, chromium (III) sulfate, chromium (III) sulfate guanidium, chloropentaaquochromium (III) chloride, hexacarbonyl chromium, hexacarbonyl molybdenum, hexacyanomanganese (II) acid potassium, manganese (II) sulfate, ammonium, hexacyanoiron (II) acid ammonium, hexacyanoiron (III) acid ammonium, hexacyanoiron (II) acid potassium, hexacyanoiron (III) acid potassium, cobalt (II) chloride ammonium, hexacyanocobalt (III) acid potassium, hexanitrocobalt (III) acid potassium, hexaamminecobalt (II) chloride, hexaammine cobalt (III) chloride, nickel (II) chloride ammonium, hexaamminenickel (II)

chloride, tetraamminenickel (II) nitrate, tetracyanonickel (II) acid potassium, pentacyanonitrosyliron (III) acid sodium, tetracarbonylnickel (O), cyanodicarbonylnitrosylcobalt acid (O), bis(cyclopentadienyl) iron (II), bis(di methylglyoximate) nickel (II) and ethylenediaminetetraacetatecobalt acid (III) sodium. However, the specific compounds useful in the present invention are not limited to the foregoing examples.

When the dispersed amounts of these metal salts in the synthetic polymer are more than 0.1 percent by weight, it is actually possible to make the said polymer a photosensitive material. The preferable range varies depending upon the form of the polymeric product (film or other shaped article), the degree of intended photosensitiveness, and the coordination capacity of the polymer (number of functional groups having the aforesaid coordination bonding capacity and their density). However, normally the range is about 0.5 – 20 percent by weight. Dispersion of a large amount such as more than 200 percent by weight is possible with specific combinations of polymers and metal salts.

Various methods may be used to disperse these metal salts in a molecular state in a synthetic polymer and to produce the photosensitive metal salt - polymer complex. In the preferred method, a synthetic polymer is immersed in a solution of a metal salt obtained by dissolving the metal salt in water or other proper medium. For example, when polyamide film is immersed in an aqueous solution of a metal salt, the metal salt is easily dispersed in a molecular state in the polyamide and a coordination bond is formed.

Other methods include (1) adding the metal salt at the time of polymerization of the synthetic polymer, (2) dissolving the metal salt and the polymer in a common solvent and forming a complex by a dry or wet method, (3) kneading the metal salt into a molten polymer and (4) dispersing the metal ion in molecular state in a polymer using a soluble metal salt, thereafter treating it with a proper acid or salt to effect anion exchange and resultingly dispersing an insoluble metal salt. Depending on the particular combination of polymer and metal salt, and the intended use of the product, one of the foregoing methods may be properly selected.

When irradiated, the photosensitive material of the present invention changes in absorptivity either in the visible part of the spectrum, resulting in a color change, or outside the visible (near infrared or ultraviolet) in an absorption band. Various modes of color change may be produced when the material of the present invention is irradiated, including deeper coloration of a colorless or light-colored material, a change in color from one color to another, or a discoloration of a deep-colored material. Color deepening materials may be utilized to produce a positive reproduction and discoloring materials for negative reproductions.

The film, fabric, sheet or other forms of the photosensitive material of the present invention are generally irradiated by an ordinary process. The light source used for irradiation may be different depending on the position of the absorption band of the photosensitive polymer complex and the sensitive wave length zone thereof. However, the change induced by the light generally takes place by absorption of the light in a charge transfer absorption band where the absorption coefficient is large in the visible or the ultraviolet area of the absorption band of the polymer complex. Accordingly, a light containing the wave length of said absorption band will effect the change. Preferred for this purpose are low pressure mercury lamps, high pressure mercury lamps, super high pressure mercury lamps, xenon lamps and carbon arc lamps. If a characteristic emission wave length of a lamp coincides with the absorption band of a polymer complex, a very high sensitivity is obtained. One example of this is the combination of nylon 12·$CuCl_2$( 363m$\mu$) with a high pressure mercury lamp (365m$\mu$).

The time necessary to effect a light-induced change can be readily determined depending on the kind of light source used, the distance between the light source and the object of irradiation, the coordination ratio of the metal salt and the amount of sensitizer used, if any.

Following irradiation, the photosensitive material of the present invention may be subjected to a proper after-treatment, such as heat treatment or treatment with a dyestuff or other chemical reagent.

Many of the photosensitive materials of the present invention have reversible photosensitivenesses, however, some of them have irreversible photosensitivenesses. Photochromism is the property of reversible photosensitiveness. Examples of polymer-metal salt complexes having this property are nylon·cupric chloride, nylon·cupric bromide, polymethacrylic·acid·cupric chloride, polymethyl methacrylate·cupric chloride, polyacrylamide·cupric chloride, polystyrene·cupric chloride, polyacrylonitrile·cupric chloride, polyethylene terephthalate·cupric acetate, nylon 6·cobalt (II) iodide, nylon 6·cobalt (II) chloride, nylon 4·cobalt (II) iodide, polyacrylonitrile·cobalt (II) iodide, cellulose·cobalt (II) iodide, nylon 6·ferrous chloride, nylon 6·ferric chloride, nylon 6·chromium (III) chloride, nylon 12·chromium (III) chloride, nylon 12·ferric chloride, polyacrylonitrile·ferric chloride and polymethyl methacrylate·ferric chloride. Examples of polymer-metal salt complexes having irreversible photosensitiveness are nylon·silver nitrate, nylon·silver perchlorate, nylon·silver chloride, nylon·silver bromide, nylon·zinc chloride, nylon·cadmium bromide, nylon·mercuric bromide, polyurethane·cupric chloride, polyacrylonitrile·chromium (III) chloride, polyethylene terephthalate· chromium (III) acetate, nylon 6·molybdenum (V) chloride, nylon 12·molybdenum (V) chloride, polystyrene·molybdenum (V) chloride, polyvinyl chloride .molybdenum (V) chloride, polymethyl methacrylate·molybdenum (V) chloride, polyvinyl chloride·ferric chloride, polyethylene terephthalate·cobalt (II) acetate, melamine resin·nickel (II) chloride, polyvinyl alcohol·nickel (II) chloride, and nylon 12·cobalt (II) chloride.

As mentioned above, the photosensitive materials of the present invention may be further treated after irradiation as follows:

1. Heating in air to 50° – 200° C. for 1 – 30 minutes to cause a color change or to fix or make permanent a color change induced by irradiation and/or heating. It should be noted that some of the materials of the present invention are thermochromic, i.e., the heat induced color change therein is reversible, and such materials return to their original color when they return to room temperature.
2. Treating the material with dyestuffs or other chemical reagents to cause a selective color change.

For polymer complexes which show photooxidation or photoreduction, the chemical reagents of (2) above may be any reagent reacting selectively with either one of two metal ions of different valence (for example, $Cu^{++}$ and $Cu^{+}$or $Fe^{+++}$ and $Fe^{++}$). Such reagents include NaOH, KOH, KI, $Na_2CO_3$, $K_3Fe(CH)_6$, benzidine, $Na_2S$ and $Na_2S_2O_4$, and these reagents are usually used as aqueous solutions.

As the dyestuffs of (2) above, substantive dyestuff, acid dyestuff and dispersed dyestuff may be used. Selective dyeing utilizes blocking of a dye fixing seat by the complex bond of the polymer-metal complex and cutting the complex bond by irradiation to thereby open the fixing seat.

Complexes which may be treated in accordance with (1) above include nylon·cupric chloride, polyvinyl alcohol·cupric chloride, polyvinyl chloride·molybdenum (V) chloride, polymethyl methacrylate·molybdenum (V) chloride, nylon·ferric chloride, polyvinyl chloride·ferric chloride and polymethyl methacrylate·ferric chloride. Complexes showing thermochromism include nylon·cupric chloride, polymethacrylic acid·cupric chloride, methyl polymethacrylate·cupric chloride, polyacrylamide·cupric chloride, polystyrene·cupric chloride, polyacrylonitrile·cupric chloride, polyethylene terephthalate·copper acetate, nylon·copper iodide, nylon 6·chromium (III) chloride, nylon 6·cobalt (II) chloride, nylon 6·cobalt (II) iodide, nylon 4·cobalt (II) iodide, cellulose·cobalt (II) iodide, polyacrylonitrile·cobalt (II) iodide and polymethyl methacrylate cobalt (II) iodide. Heat sensitive materials in which the color change is fixed include nylon 6·molybdenum (V) chloride, polyvinyl chloride·molybdenum (V) chloride, polymethyl methacrylate·molybdenum (V) chloride, polyvinyl alcohol·ferric chloride, polymethyl methacrylate·ferric chloride and nylon 6·cobalt (II) chloride. Complexes which may be selectively treated with chemical reagents as taught in (2) above include nylon·cupric chloride, nylon·cupric bromide, nylon·ferric bromide and hylon·ferric chloride. Nylon·cupric chloride, nylon·silver nitrate and nylon ferric chloride are examples of materials which may be selectively treated with dyestuffs in accordance with (2) above. The foregoing are examples of various classes of material which may be subjected to specific after treatment within the scope of the present invention. These classes, however, are not limited to the examples given.

That the photosensitive material of the present invention comprises a polymer complex can be easily confirmed by ordinary analytical means. For example, when the metal salt is cupric chloride, yellow complexes are formed with polyamide, polyacrylonitrile or melamine resin while green complexes are formed with polyvinyl alcohol, polymethyl methacrylic acid, polyvinyl acetate, polyvinyl chloride, polymethacrylic acid or polystyrene. The yellow complex shows, in the vicinity of 900 – 1,000m$\mu$, an absorption band due to a $d \rightarrow d^*$ transition which is characteristic of a complex bond. The yellow complex also shows a charge transfer absorption band from a ligand to $Cu^{++}$ at 260 – 300m$\mu$ and 360 – 400m$\mu$. The green complex shows a $d \rightarrow d^*$ absorption band in the vicinity of 700 – 900m$\mu$, and a charge transfer absorption band at 270 – 290m$\mu$. These absorption characteristics indicate that $Cu^{++}$ forms a complex bond with the functional group of the polymer. Further, with reference to polyamide, NH stretching vibration ($\gamma$NH) and C=O stretching vibration ($\gamma$C=O) of the amide group appears in the infrared absorption spectrum and shows changes of $\Delta\gamma NH=+15\ cm^{-1}$ and $\Delta\gamma C=O=-45\ cm^{-1}$ for nylon 6·$CuCl_2$ (M(CONH):M($Cu^{++}$)=8:1), $\Delta\gamma NH=+15\ cm^{-1}$ and $\Delta\gamma C=O=-45\ cm^{-1}$ for nylon 6·$CuBr_2$ (M(CONH):M($Cu^{--}$)=4:1, and $\Delta\gamma NH=+5\ cm^{-1}$ and $\Delta\gamma C=O=-50\ cm^{-1}$ for nylon 12·$CuBr_2$ (M(CONH):M($Cu^{++}$)=4:1), where M represents mol. This demonstrates that the oxygen atom of the amide bond coordinates to $Cu^{++}$. Furthermore, when the electron spin resonance (ESR) spectrum of the cupric salt polymer complex is measured, a "$g$" value and four hyper fine structures characteristic to $Cu^{++}$ accompanying a ligand are observed.

With respect to heat sensitivity, the yellow complex of $CuCl_2$ exhibits a quick reversible change of color of yellow ↔ reddish brown. A $CuCl_2$·nylon 6 complex and a $CuCl_2$·nylon 12 complex can be repeatedly used at a temperature below 100° C. The green complex of $CuCl_2$ exhibits a reversible change of green ↔ dark brown and a brown complex of $CuBr_2$ exhibits a reversible change of brown ↔ dark green.

Yellow complexes of $CoI_2$ and $CoBr_2$ with polyamides, polyacrylonitrile and polymethyl methacrylate also show reversible thermochromic change to green or greenish blue in the temperature region of 40° – 80° C. The temperature of color change and speed of response can be conveniently controlled by changing the chemical composition of the polymer by copolymerization or blend.

According to the present invention, by coordinating a simple metal salt to a polymer, it is possible to impart photosensitiveness to the polymer. It is possible to select various effects of photosensitiveness (change of the absorption band, coloration and discoloration) by varying the combination of polymer and metal salt or choosing various ways of after treatments. Also, at the same time, by properly adding a sensitizer and an additive, it is possible to improve said effect. This invention is characterized by the fact that the particular property of photosensitiveness is imparted to a polymer used as a base while the excellent properties of said polymer such as mechanical properties and heat resistance are retained. The product therefore has material properties, such as toughness, unseen in conventional photosensitive material. Also, because the photosensitive site is molecularly dispersed, its image resolving power is very high. Further, an intermediate color tone can be well developed. That various degrees of coloration, in both positives and negatives, can be selected is also an advantage of the present invention. In addition, images formed in these materials of the present invention are permanent and do not tend to fade.

The polymer complex may be used as a photosensitive film for slides (which are turned over, developed and fixed as a negative) or as direct reproducing materials. By immersing a fabric woven from a yarn spun from a polymer with the copper salt complex dispersed therein, it is possible to make a part or the whole fabric photosensitive. Further, by dissolving a metal salt and a polymer in a common solvent and applying the solution to a glass, fabric or paper sheet, it is possible to impart photosensitiveness to such sheets. Furthermore, utilizing the thermochromism properties of some of the material of the present invention, it is possible to use the polymer complex as a temperature indicating material or in toys.

EXAMPLE 1

*a*. A nylon-6 film, approximately 100$\mu$ thick, was immersed in a 50 percent by weight aqueous solution of $CuCl_2$ at 80° C for 30 minutes. An increase of weight, by coordination complexing with $CuCl_2$, of 15 percent was observed and the film was yellow. This polymer complex film showed three absorption bands at 930m$\mu$($\epsilon \sim 200$), 270m$\mu$($\epsilon \sim 2,500$) and 400m$\mu$($\epsilon \sim 400$), indicating that a complex was formed between $Cu^{++}$ and the amide group of the nylon-6. When this yellow film was irradiated with a light at a distance of 15 centimeters from a light source, comprising a 250 watt high pressure mercury lamp, for 30 minutes, the yellow color disappeared and the film became colorless. At the same time, the aforesaid three absorption bands disappeared, showing that the light had cut the complex bond. From observation of the ESR spectrum of the $Cu^{++}$ forming the complex bond and from the fact that the yellow color disappeared upon irradiation, it was understood that a light reduction reaction of $Cu^{++}$ to $Cu^{+}$ took place. When the film thus rendered colorless by irradiation was left to stand in a dark place for several hours, the film reversibly returned to the original yellow color, demonstrating inverse photochromism.

*b*. When the yellow film made in (*a*) was heated to more than 80° C, it changed to reddish brown. However, when the temperature was returned to room temperature, the film immediately returned to the original yellow, thus exhibiting thermochromism. It is possible to repeat this thermochromic reaction at temperatures up to 100° C.

*c*. When the colorless film irradiated with the light in (*a*) was heated at 120° C for 10 minutes, it became brown. Further, it was found that this brown color was fixed or permanent. Utilizing this property, the yellow film of (*a*) was contacted with a silver salt negative of a photograph. The film was then irradiated with light as in (*a*) and heated at 120° C for 10 minutes to obtain a brown positive on a yellow ground. The film was then washed (either hot water or diluted sulfuric acid may be used) to remove the unreacted $CuCl_2$. The result was a brown positive on a colorless ground. In an alternative procedure, the film was first washed after irradiation and then heated. The same brown positive reproduction resulted. The image thus obtained had good resolution and intermediate color tone and could be used as a positive for slide projection.

*d*. The yellow film of (*a*) was contacted with a silver salt photographic negative and irradiated. The film was then immersed in an aqueous solution of NaOH and heated. The resultant product was a negative good in contrast wherein only the non-irradiated part was colored a dark brown.

*e*. When the film irradiated as in (*d*) was immersed in an aqueous solution of KI and heated, the non-irradiated part became orange in color and a negative reproduction was thus produced.

*f*. When the film irradiated as in (*d*) was washed with dilute sulfuric acid and treated with an aqueous solution of $K_3Fe(CN)_6$, the irradiated part became colored to form a permanent brown image.

*g*. When the film irradiated as in (*d*) was immersed in an aqueous solution of $Na_2S$ and heated, the non-irradiated part became dark green in color and the irradiated part became brown. An image with good contrast was thus made.

*h*. When the film irradiated as in (*d*) was immersed in an aqueous solution of $Na_2S_2O_4$, the irradiated part became a permanent or fixed grey color.

*i*. When the film irradiated as in (*d*) was immersed in an acetic acid solution of benzidine containing a small amount of KI, and thereafter immersed in dilute sulfuric acid, the irradiated part became brown in color.

*j*. When the film irradiated as in (*d*) was immersed in an aqueous solution of $Na_2CO_3$, the non-irradiated part became dark brown in color and formed a negative image.

*k*. When the film irradiated as in (*d*) was immersed in a dilute sulfuric acid solution of $Na_2S_2O_3$, the non-irradiated part became green in color and the irradiated part became blue.

*l*. When a fabric woven from a nylon-6 yarn was immersed in a 50 percent by weight aqueous solution of $CuCl_2$ and treated at 80° C for 2 – 3 minutes, 10 – 20 percent by weight of $CuCl_2$ was added to the fabric as a coordinately bonded complex and a yellowish green fabric was made. A mask was contacted with this fabric and the fabric was irradiated with the light under conditions as in (*a*) for 20 minutes, then heated at 130° C for 10 minutes and washed with water. It was then possible to print brown letters and patterns on a white background on this fabric.

*m*. When the film irradiated as in *d* was immersed first in a hot aqueous solution of NaOH((10 – 15 weight percent) and then in a dilute sulfuric acid, a layer of metallic copper was formed on the irradiated portion of the film. This copper layer was highly electrically conductive. (Wherein $\epsilon$ is moleculer extinction coefficient, and ESR spectrum is Electron Spin Resonance Spectrum.)

EXAMPLE 2

A 70$\mu$ thick nylon-12 film was immersed in a 50 percent by weight aqueous solution of ferric chloride at 85° C for 30 minutes. The film weight increased by 6.10 percent and the film became yellow in color due to coordination bonding between the nylon film and the ferric salt. The film-metal salt complex had absorption maximums at 365m$\mu$ and 315m$\mu$. When a negative was placed in contact with the yellow film and the two were irradiated with an ultraviolet lamp, more specifically a high pressure mercury lamp, for 5 minutes, the film became colorless and transparent in the irradiated portion. At the same time, the aforesaid absorption bands disappeared. However, when this colorless transparent film was left to stand or heated to a temperature below 100° C, the color reversibly returned to the original yellow. When said colorless transparent film was treated at 130° C for 5 minutes, the irradiated part assumed a yellowish brown color. A permanent and fixed image was thus obtained.

EXAMPLE 3

An 80$\mu$ thick nylon-6 film was immersed in a 50 percent by weight aqueous solution of ferric chloride at 85° C for 20 minutes. The weight of the film increased by 8.1 percent and the film became yellow, due to the formation of ferric salt coordination complexes which had characteristic absorption bands at 365m$\mu$ and 313m$\mu$. When said film was placed in contact with a negative and the two were irradiated with ultraviolet rays for 8 minutes from a high pressure mercury lamp, the irradiated portion of film discolored and became colorless and transparent. At the same time, the aforesaid absorption bands disappeared. When said colorless transparent film was left to stand or heated to a temperature below 100° C, it reversibly returned to the original yellow. When said colorless transparent film was treated at 130° C for 5 minutes, the irradiated part assumed a yellowish brown color, which formed a fixed and permanent image. When said film was further treated with hot water, the non-irradiated part changed color from yellow to orange.

EXAMPLE 4

A ferric chloride - nylon-6 complex having a coordination ratio of 11 percent by weight was prepared, placed in contact with a negative and irradiated with ultraviolet rays. The irradiated part became colorless, while the non-irradiated part remained yellow. When this complexed and irradiated material was treated with chemicals, the following results were obtained:

4 - *a* Immersion in heated ammonia water; in which after 13 minutes, the non-irradiated part changed color from yellow to orange and the irradiated part changed from colorless to dark brown. A positive fixed image was obtained. With an immersion time of 2 minutes, the irradiated part became white orange.

4 - *b* Chemical treatment with specific reagent (results indicated in table);

| Reagent | | After Treatment (All fixed images) |
|---|---|---|
| Aqueous solution of NaOH | Irradiated part | Brown |
| | Non-irradiated part | Light brown |
| Aqueous solution of $Na_2CO_3$ | Irradiated part | Drab (easily removable) |
| | Non-irradiated part | Brown |
| Aqueous solution of $K_3Fe(CN)_6$ | Irradiated part | Blue |
| | Non-irradiated part | Yellow |
| Aqueous solution of $K_4Fe(CN)_6$ | Irradiated part | Blue |
| | Non-irradiated part | Yellow |

EXAMPLE 5

An 80$\mu$ thick nylon-12 film was immersed in a 41.8 percent by weight aqueous solution of cupric chloride at 79° C for 1 hour. As a result, the weight increased by 8.7 percent by weight due to coordination of the cupric salt. The nylon-12 film immersed exhibited a light yellow color, having a maximum absorption at 363m$\mu$. When said film was irradiated with a 250 watt high pressure mercury lamp at a distance of 15 cm for 3 minutes, said absorption band disappeared and the film became colorless. Said film showed photochromism and when irradiation of the light was stopped, the color of the film returned to light yellow. The colorless irradiated image was rendered non-photochromic or permanently colorless by immersion in hot water. Heating the film in air, however, caused the irradiated colorless image to assume a permanent yellowish-brown color.

EXAMPLE 6

An 80$\mu$ thick nylon-6 film was immersed in a 33 percent by weight aqueous solution of cupric bromide at 80° C for 1 hour. As a result, the weight increased by 16 percent by weight due to coordination of the cupric salt.

The immersed nylon-6 film became brown, having a maximum absorption at 532m$\mu$.

When irradiated with light this film, became colorless and the absorption band disappeared. When, however, the film was left to stand, the color returned to the original brown. These changes were traced by analysis of absorption characteristics in the infrared spectrum. Upon treatment with said salt, an absorption band of amide I of nylon-6, 1,640 $cm^{-1}$, transferred to 1,590 $cm^{-1}$. This indicates formation of a strong complex bond with copper ion. When irradiated, this complex bond was cut and the C = O stretching vibration returned to 1,640 $cm^{-1}$. When the material was left to stand, the complex bond reappeared with the characteristic yellowish brown color, and at the same time, an absorption band of 1,590 $cm^{-1}$ was again observed.

EXAMPLE 7

An 80μ thick nylon-6 film was immersed in a 20 percent by weight aqueous solution of silver perchlorate at 80° C for 3 hours. As a result, the weight increased by 8.6 percent due to coordination of the silver salt. When irradiated with light the immersed nylon-6 film changed from colorless to yellow, showing a new maximum absorption at 408mμ.

EXAMPLE 8

A 90μ thick nylon-12 film was immersed in a 20 percent by weight aqueous solution of silver perchlorate at 80° C for 3 hours. As a result, the weight increased by 1.0 percent due to coordination of the silver salt. When the immersed nylon-12 film was irradiated with light, it changed color from colorless to orange, showing a new maximum absorption at 457mμ.

EXAMPLE 9

An 80ρ thick nylon-6 film was immersed in an aqueous solution of saturated mercuric chloride at 80° C for 5 hours. As a result, the weight increased by 29 percent due to coordination of the mercuric salt. When the immersed nylon-6 film was irradiated with a light, it changed in color from colorless to grey and greyish-brown, showing an extensive new absorption band from the visible to the ultraviolet part of the spectrum.

EXAMPLE 10

In 30 ml of dimethyl formamide, 1.2 g of polyacrylonitrile and 35 mg of cupric chloride were dissolved and from the resultant solution a 21μ thick film was cast and formed.

As a result, 3.23 percent (based on polyacrylonitrile) by weight of the cupric salt coordinated with the polyacrylonitrile. This film was yellow in color, showing maximum absorptions at 260mμ and 400mμ and also at 950mμ in the near infrared region.

When irradiated, these absorption maximums disappeared and the color of the film disappeared.

EXAMPLE 11

An 80μ thick melamine resin film was immersed in a 50 percent by weight aqueous solution of cupric chloride at 90° C for 4 hours. As a result, the weight of the film increased by 2.9 percent to coordination of the cupric salt. The immersed melamine film was yellow in color, having a maximum absorption at 400mμ. When irradiated, this absorption maximum disappeared and the film became colorless.

EXAMPLE 12

In 50 ml of a 1 : 1 mixed solvent of acetone and benzene, 1.2 grams of polystyrene and 30 milligrams of cupric chloride were dissolved and from the resultant mixed solution a 90μ thick film was cast and formed. As a result, 2.65 percent (based on polystyrene) by weight of the cupric salt coordinated with the polystyrene. This film was green in color, showing absorption in the ultraviolet part of the spectrum at 280mμ. When irradiated, this absorption band disappeared and the film became white. After the irradiation, when the film was heated, its color changed from white to brown. When the non-irradiated green film was heated, its color changed to brown, showing reversible thermochromism.

EXAMPLE 13

In 50 milliliters of methanol, 0.93 grams of polymethacrylic acid and 26.3 milligrams of cupric chloride were dissolved and from the resultant solution a 20μ thick film was cast and formed. As a result, 2.8 percent (based on the polymer) by weight of the cupric salt coordinated. The treated polymethacrylic acid film was green, showing absorption bands at 700mμ and, in the ultraviolet region, also at 270mμ. When this film was irradiated, the color changed to brown having an absorption position at 340 - 360mμ. When the irradiation was discontinued, the color of the film returned to green. When the green film was heated, its color changed to brown. This change also was reversible, however, indicating that the complex was thermochromic as well as photochromic.

EXAMPLE 14

In 50 milliliters of water, 1.08 grams of polyvinyl alcohol and 34.5 milligrams of cupric chloride were dissolved and from the resultant solution a 90μ thick film was cast and formed. As a result, 2.68 percent (based on the polymer) by weight of the cupric salt coordinated. The treated polyvinyl alcohol film was green, showing a maximum absorption at 870mμ and also at 263mμ in the ultraviolet region. When this film was irradiated, the color changed to greenish brown. After irradiation, heating caused the color to change from greenish-brown to yellowish-brown and further to black and finally to become fixed or permanent.

EXAMPLE 15

In a 1 : 1 mixed solution of acetone and benzene, 1.1 grams of methyl polymethacrylate and 30 milligrams of cupric chloride were dissolved and from the resultant mixed solution, a 90μ thick film was cast and formed. As a result, 2.65 percent (based on the polymer) by weight of the cupric salt coordinated. The treated methyl polymethacrylate film was green, showing absorption bands at 700mμ and, in the ultraviolet region, at 270mμ. When this complexed film was irradiated, the absorption band at 270mμ decreased and the color changed to yellowish-brown. When the irradiation was stopped, the color returned to green, demonstrating that the complex was photochromic. When the non-irradiated green film was heated, it underwent a reversible color change to yellowish-brown.

EXAMPLE 16

From the mixed solution obtained by dissolving 1.1 grams of polyacrylamide and 35 milligrams of cupric chloride in 60 milliliters of water, a 20μ thick film was cast and formed. As a result, 3.09 percent (based on the polymer) by weight of the cupric salt coordinated. This film was green, showing an absorption band at 700mμ.

When this film was irradiated, the color changed to yellowish-brown. When the irradiation was stopped, the color returned to green, which showed that the complex was photochromic.

And when the non-irradiated green film was heated, the color changed reversibly to yellowish-brown.

EXAMPLE 17

From a solution obtained by dissolving 22.4 milligrams of cupric chloride and 1.25 grams of polyvinyl acetate in 50 milliliters of methanol, a 26μ thick film was cast and formed. As a result 1.6 percent (based on the polymer) by weight of the cupric salt coordinated. This film was green, having an absorption band at 700mμ and, in the ultraviolet region, also at 285mμ. When the irradiation was stopped, the color returned to green, showing that the complex was photochromic. When the non-irradiated green film was heated, the color underwent a reversible change to dark brown.

EXAMPLE 18

From a solution obtained by dissolving 1.06 grams of polyethylene terephthalate and 0.11 grams of cupric acetate in 50 milliliters of trifluoroacetic acid, a 30μ thick film was cast and formed. As a result, 10 percent (based on the polymer) by weight of the cupric salt coordinated. The treated film was blue, showing an absorption band in the ultraviolet region at 340 - 360mμ. When this film was irradiated, an absorption band of 700mμ appeared and the color changed from blue to green. When the irradiation was stopped, the color returned to blue again, showing that the complex was photochromic. When the blue film was heated, the color underwent a reversible change to green.

EXAMPLE 19

A 45μ thick polyurethane film was immersed in a 50 percent by weight aqueous solution of cupric chloride at 80° C for 1 hour. As a result, the weight of the film increased by 0.60 percent and the film became reddish-brown, which film had maximum absorptions at 360mμ, 555mμ and 820mμ. When this film was treated with ultraviolet rays, the color changed to yellow.

EXAMPLE 20

A 140μ thick nylon-6 film was immersed in a 10 percent by weight aqueous solution of zinc chloride at 80° C for 4 hours. As a result, the weight of the film increased by 19.2 percent due to coordination of the zinc salt. The immersed nylon-6 film was colorless, hardly showing any absorption up to 260mμ. However, when this film was irradiated, a new absorption band of 280mμ appeared.

EXAMPLE 21

A 150μ thick nylon-6 film was immersed in a 50 percent by weight aqueous solution of chromium (III) chloride at 80° C for 5 hours. As a result, the weight of the film increased by 21 percent due to coordination of the chromium salt. The immersed nylon-6 film became green, showing maximum absorptions in the ultraviolet part at 313mμ and 366mμ and a shoulder (an intermediate flat area on the absorption curve) at 430mμ. In the visible part, the film showed a maximum absorption at 624mμ and a shoulder at 700mμ. Using a 250 watt high pressure mercury lamp, the film was irradiated at a distance of 10 centimeters from the light source for 10 minutes. The color of the complexed film changed to reddish-violet and, at the same time, the absorption bands in the ultraviolet region disappeared and in the visible region, new absorption bands of 500mμ, 690mμ and 720mμ developed. When this complexed film was heated to 100° C, the same change was shown. It was observed that when these irradiated or heated films were left to stand in a dark place, the color returned reversibly to the original green, and, at the same time, the original absorption characteristics reappeared.

EXAMPLE 22

A 120μ thick nylon-6 film was immersed in a 10 percent by weight aqueous solution of cadmium bromide at 80° C for 4 hours. As a result, the weight of the film increased by 15.9 percent due to coordination of the cadmium salt. The immersed nylon-6 film was colorless, hardly showing any absorption up to 260mμ. However, when irradiated, a new absorption band of 285mμ appeared.

EXAMPLE 23

In 30 milliliters of acetone, 3.1 grams of polymethylmethacrylate and 0.132 grams of chloroauric acid ($HAuCl_4$) were dissolved and the resultant solution was cast on a glass plate to obtain a 50μ thick film. As a result, 4.2 percent (based on the polymer) by weight of gold salt was coordinated. This film was yellow, showing maximum absorption at 325mμ. When this film was irradiated with light, the color changed to brown and a new absorption band of 550mμ appeared.

EXAMPLE 24

A 128μ thick nylon-12 film was immersed in a 67 percent by weight aqueous solution of chromium (III) chloride at 80° C for 9 hours. As a result, the weight of the film increased by 5.5 percent due to coordination of the chromium salt. The immersed nylon-12 film was yellow, showing maximum absorptions in the ultraviolet region at 315mμ and 356mμ. When this film was irradiated with a high pressure mercury lamp for 5 minutes, it became colorless and, at the same time, the absorption bands in the ultraviolet region disappeared. When the film was left to stand in a dark place, the color returned to the original yellow.

EXAMPLE 25

In 20 milliliters of trifluorinated acetic acid, 0.51 grams of chromium (III) chloride and 0.63 grams of polyethylene terephthalate were dissolved. The resultant solution was cast on a glass plate to obtain a 31μ thick bluish-green film, which showed absorption bands at 425mμ and 386mμ. When this film was irradiated with a high pressure mercury lamp for 10 minutes, a slight change was observed, namely the bluish-green became deep and the two absorption bands moved toward longer wave lengths. When this irradiated film was heated, the two absorption bands moved further toward the longer wave lengths.

EXAMPLE 26

In 20 milliliters of dimethyl formamide, 0.03 grams of chromium (III) chloride and 1.04 grams of polyacrylonitrile were dissolved. The resultant solution was cast on a glass plate to obtain an 87μ thick green film, which showed absorption bands at 430mμ and 626mμ. When this film was irradiated with a high pressure mercury lamp for 10 minutes, movement of the absorption bands, on the order of 10 to 100mμ, toward longer wave lengths was observed.

EXAMPLE 27

A 100μ thick nylon-6 film was immersed in a 10 percent by weight aqueous solution of molybdenum (V) chloride at 30° C for 15 minutes. As a result, the weight of the film increased by 7.7 percent due to coordination of the molybdenum salt. The immersed film was blue, showing maximum absorptions in the ultraviolet region at 400mμ and in the visible region at 700mμ. When this film was irradiated with a high pressure mercury lamp, the color changed to yellow and the two absorption bands disappeared.

EXAMPLE 28

A 90μ thick nylon-12 film was immersed in a 20 percent by weight aqueous solution of molybdenum (V) chloride at 80° C for 3 hours. As a result, the weight of the film increased by 7.7 percent due to coordination of the molybdenum salt. The immersed film was blue. When this film was irradiated with a high pressure mercury lamp, an absorption band in the vicinity of 700mμ developed and the blue became deeper.

EXAMPLE 29

In 20 milliliters of benzene, 0.05 grams of molybdenum (V) chloride and 1 gram of polystyrene were dissolved, and the resultant solution was cast on a glass plate to obtain a 70μ thick greyish blue film, which had a shoulder in the ultraviolet region at 310mμ and a weak absorption band in the vicinity of 700mμ. When this film was irradiated with a high pressure mercury lamp, the absorption band in the ultraviolet region disappeared, the absorption band in the vicinity of 700mμ became strong and the greyish blue color became deeper.

EXAMPLE 30

In a 1 : 1 mixed solvent of carbon disulfide and acetone, 0.09 gram of molybdenum (V) chloride and 0.65 gram of polyvinyl chloride were dissolved. The resultant solution was cast on a glass plate to obtain a 23μ thick yellowish-brown film, which showed absorption bands at 240mμ, 305mμ and 446mμ. When this film was irradiated with a high pressure mercury lamp, the color changed to dark bluish-green, and, at the same time, the absorption band of 446mμ disappeared and a new absorption band appeared at 700mμ.

EXAMPLE 31

An 85μ thick nylon-6 film was immersed in a 25 percent by weight aqueous solution of manganese (II) chloride at 80° C for 3 hours. As a result, the weight of the film increased by 1 percent due to coordination of the manganese salt. The film was colorless showing terminal absorption at a position less than 300mμ. When this film was irradiated with a low pressure mercury lamp, a new absorption band appeared in the vicinity of 320mμ.

EXAMPLE 32

A 75μ thick nylon-6 film was immersed in a 33 percent by weight aqueous solution of ferric chloride at 80° C for 2 hours. As a result, the weight of the film increased by 28 percent due to coordination of the iron salt. The immersed nylon-6 film was yellow, showing characteristic absorption maximums in the ultraviolet region at 240mμ, 328mμ and 360mμ. When this film was irradiated with a high pressure mercury lamp for 2 minutes, it became colorless, and, at the same time, the three absorption bands in the ultraviolet region disappeared. When this film was left to stand in a dark place or heated, the original yellow was reversibly recovered. By treating the irradiated film with an aqueous solution of potassium ferriccyanide, a fixed, i.e., permanent, blue coloration was produced. And when the immersed nylon-6 film was heated, the intensity of the absorption bands in the ultraviolet region increased. However, when said film was left to stand at room temperature, it returned to the original state.

EXAMPLE 33

A 95μ thick nylon-12 film was immersed in a 33 percent by weight aqueous solution of ferric chloride at 80° C for 2 hours. As a result, the weight of the film increased by 10 percent due to coordination of the iron salt. The immersed nylon-12 film was yellow, showing absorption bands in the ultraviolet region at 240mμ, 315mμ and 365mμ. When this film was irradiated with a high pressure mercury lamp for 5 minutes, it became colorless and, at the same time, the absorption bands in the ultraviolet region disappeared. When the film was left to stand in a dark place, the color reversibly returned to the original yellow.

EXAMPLE 34

In 20 milliliters of dimethyl formamide, 0.05 gram of ferric chloride and 1.07 grams of polyacrylonitrile were dissolved. The resultant solution was cast on a glass plate to obtain a 26μ thick yellow film, which showed maximum absorptions in the ultraviolet region at 240mμ, 318mμ and 360mμ. When this film was irradiated with a high pressure mercury lamp for 10 minutes, it became colorless and, at the same time, the absorption bands in the ultraviolet region disappeared. When this film was left to stand in a dark place or heated, the color returned reversibly to the original yellow. By treating the irradiated film with potassium ferricyanide, a permanent blue coloration was imparted to the film.

EXAMPLE 35

In 20 milliliters of water, 0.07 gram of ferric chloride and 0.61 gram of polyvinyl acetate were dissolved. The resultant solution was cast on a glass plate to obtain a 36μ thick yellow film which showed absorption maximums in the ultraviolet region at 240mμ, 314mμ and 360mμ. When this film was irradiated with a high pressure mercury lamp for 10 minutes, the yellow color lightened and a decrease of the intensity of the three absorption bands was observed. When the irradiated film was heat treated, the color changed irreversibly to a permanent or fixed yellowish-brown.

EXAMPLE 36

In 20 milliliters of water, 0.02 gram of ferric chloride and 1 gram of polyvinyl alcohol were dissolved and the resultant solution was cast on a glass plate to obtain a 60μ thick yellow film, which showed a shoulder of absorption at 290mμ. When this film was irradiated with a high pressure mercury lamp for 5 minutes, said absorption band disappeared. When this film was heated, the yellow became deeper, bringing about absorption maximums at 240mμ, 314mμ and 360mμ.

EXAMPLE 37

In a 1 : 1 mixed solvent of acetone and carbon disulfide, 0.07 gram of ferric chloride and 0.52 gram of polyvinyl chloride were dissolved, and the resultant solution was cast on a glass plate to obtain a 29μ thick yellow film which showed absorption bands in the ultraviolet region at 240mμ, 315mμ and 360mμ. This indicated a complex had been formed. When this film was irradiated with a high pressure mercury lamp for 15 minutes, the yellow became discolored and the three absorption bands decreased. When this film was further heat treated, it assumed a permanent or fixed black color.

EXAMPLE 38

In 20 milliliters of trifluoro acetic acid, 2.29 grams of cobalt (II) acetate and 1.01 grams of polyethylene terephthalate were dissolved. The resultant solution was cast on a glass plate to obtain a 27μ thick pink film, which had a maximum absorption at 520mμ. When this film was irradiated with a high pressure mercury lamp for 10 minutes, the terminal absorption in the vicinity of 350mμ in the ultraviolet region disappeared. When this film was further heat treated, the film returned to the original state.

EXAMPLE 39

In 20 milliliters of water, 1.86 grams of nickel (II) chloride and 1.36 grams of polyvinyl alcohol were dissolved. The resultant solution was cast on a glass plate to obtain a 340μ thick green film, which had maximum absorptions at 405mμ and 740mμ. When this film was irradiated with a high pressure mercury lamp for 20 minutes, the green coloration became deeper and an increase in the absorption band at 740mμ was recognized. A similar change was effected by heating the film.

EXAMPLE 40

*a.* Nylon-6 and ferric chloride

A 70μ thick nylon-6 film was immersed in a 50 percent by weight aqueous solution of ferric chloride at 80° C for 20 minutes. The weight of the film increased by 15.11 percent and the film became yellow due to coordination bonding with the ferric salt. When a negative was placed in contact with this film and the two were irradiated with ultraviolet rays for 15 minutes by a high pressure mercury lamp, the irradiated part became colorless and transparent. When this film was immersed in substantive dyestuffs (Kayanol Red BW, Kayanol milling Blue 2RW), complex salt acid dyestuffs (Kayanol Dark Brown GRLW, Kayakalon Blue Black 3BL) and dispersed dyestuffs (Rosalin Brilliant Scarlet P-GG, Doollition Fast Green 5G), the dyestuff went selectively in each case into the irradiated part only and an image of the respective color was produced.

*b.* Nylon-12 and ferric chloride

An 80μ thick nylon-12 film was immersed in a 50 percent by weight aqueous solution of ferric chloride at 90° C for 2 hours. The weight of the film increased by 19.1 percent and the film became yellow due to coordination bonding with the ferric salt. A negative was placed in contact with this film and when the two were irradiated with a light by a high pressure mercury lamp, the irradiated part discolored. When the film was immersed in acid dyestuff, dispersed dyestuff and complex salt acid dyestuff at 80° – 90° C, the dyestuff went selectively into the irradiated part only and an image was produced with each of these materials.

*c.* Nylon-6 and cupric chloride

A 70μ thick nylon-6 film was immersed in a 50 percent by weight aqueous solution of cupric chloride at 80° C for 10 minutes. The weight of the film increased by 6.5 percent and the film became yellow due to coordination bonding with the cupric salt. When this film was placed in contact with a negative and the two were irradiated with a high pressure mercury lamp for 20 minutes, the irradiated part discolored. When the irradiated film was immersed in acid dyestuff, dispersed dyestuff and complex salt acid dyestuff at 80° C for 10 seconds, the dyestuff went selectively into the irradiated part only and an image was produced in each case.

*d*. Nylon-12 and cupric chloride

An 80μ thick nylon-12 film was immersed in a 55 percent by weight aqueous solution of cupric chloride at 80° C for 2 hours. The weight of the film increased by 6.1 percent and the film became yellow due to coordination bonding with the cupric salt. When a negative was placed in contact with this film and the two were irradiated with a high pressure mercury lamp, the irradiated part discolored and became colorless. When this irradiated film was immersed in acid dyestuff, dispersed dyestuff and complex salt acid dyestuff at 80° C for 10 seconds, the dyestuff went selectively into the irradiated part only and an image was produced with each of these materials.

*e*. Nylon-6 and silver nitrate

A 70μ thick nylon-6 film was immersed in a 20 percent by weight aqueous solution of silver nitrate at 80° C for 30 minutes. The weight of the film increased by 14.3 percent and the film became yellow due to coordination bonding with the silver salt. When a negative was placed in contact with this film and the two were irradiated with a high pressure mercury lamp, the film became light yellowish-brown. When the film was immersed in acid dyestuff, dispersed dyestuff and complex salt acid dyestuff at 80° C for 10 seconds and thereafter treated with hot water to wash out excess silver nitrate, the irradiated part was dyed deep and an image was produced.

*f*. Metal salts and nylon-6

Selective coloration has also been demonstrated with acid dyestuff, dispersed dyestuff and complex salt acid dyestuff in ultraviolet irradiated nylon-6 complexed with the following metal salts:

Metal salt (showing coordination ratio)

$ZnCl_2$ (30.2% by weight)
$NiCl_2$ (2.8% by weight)
$MoCl_5$ (5.0% by weight)
$FeBr_2$ (6.3% by weight)
$CuBr_2$ (5.7% by weight)
$CrCl_2$ (9.7% by weight)
$HgBr_2$ (5.1% by weight)
$CoBr_2$ (18.4% by weight)
$MnCl_2$ (6.2% by weight)
$BaCl_2$ (7.7% by weight)

*g*. Irradiated complexes of nylon-6 with cupric chloride and with ferric chloride have also developed images of good contrast with complex salt acid dyestuff, acid dyestuff and dispersed dyestuff dissolved in amyl alcohol, isopropyl alcohol, dioxane, cyclohexanone, benzaldehyde, cyclohexanol and octyl alcohol as organic solvents.

What is claimed is:

1. A photosensitive material comprising a synthetic polymer, selected from the group consisting of polyamide, polyester, polyvinyl alcohol, polyvinyl acetate, polyvinylchloride, polystyrene, polyacrylic nitrile, polymethylmethacrylate, polyurethane, polyacrylamide and melamine, containing at least 0.1 percent by weight based on the polymer weight of a salt of a metal selected from the group consisting of copper, iron, silver, gold, mercury, cadmium, barium, chromium, molybdenum, manganese, nickel, cobalt and zinc, said synthetic polymer having constituents consisting of one or more of the following, oxygen, sulphur, phosphorous, nitrogen, halogen and aromatic nuclei, said polymer being coordination bonded with said metal salt through said constituents.

2. The photosensitive material of claim 1, wherein said polymer is nylon.

3. The photosensitive material of claim 1, wherein said polymer is a polyamide.

4. The photosensitive material of claim 1, wherein said polymer is a polyester.

5. The photosensitive material of claim 1, wherein said metal salt consists of one of the following: cupric chloride, ferric chloride, cupric bromide, silver perchlorate, mercuric chloride, cupric acetate, zinc chloride, chromium (III) chloride, cadmium bromide, chloroauric acid, chromium (III) oxide, molybdenum (V) chloride, manganese chloride, cobalt (II) acetate, nickel (II) chloride, silver nitrate, cobalt bromide, barium chloride, mercuric bromide, ferrous bromide and chromium (II) bromide.

6. The photosensitive material of claim 1, wherein said metal salt is cupric chloride.

7. The photosensitive material of claim 1, wherein said metal salt is ferric chloride.

8. The photosensitive material of claim 1, wherein the anion of said metal salt consists of one of the following: chloride, bromide, perchlorate, acetate or oxide.

9. The photosensitive material of claim 1, wherein said polymer is in film form.

10. The photosensitive material of claim 1 wherein said metal salt comprises 0.5–20 percent by weight based on the polymer weight of said material.

11. A process for the preparation of the photosensitive material of claim 1 which comprises immersing a shaped article comprised of a polymer, selected from the group consisting of polyamide, polyester, polyvinyl alcohol, polyvinyl chloride, polystyrene, polyacrylic nitrile, polymethylmethacrylate, polyurethane, polyacrylamide and melamine and having an oxygen, sulphur, phosphorous, nitrogen, halogen, or aromatic constituent in a solution of a salt of a metal selected from the group consisting of copper, iron, silver, gold, mercury, cadmium, barium, chromium, molybdenum, manganese, nickel, cobalt and zinc to form on the surface of said shaped article a complex bond between at least 0.1 percent by weight based on the polymer weight of said salt and said constituent of said synthetic polymer.

12. A process for the preparation of a photosensitive material, as recited in claim 11, wherein said polymer is a polyamide.

13. A process for the preparation of a photosensitive material, as recited in claim 11, wherein said polymer is a polyester.

14. A process for the preparation of a photosensitive material, as recited in claim 11, wherein said metal salt is cupric chloride.

15. A process for the preparation of a photosensitive material, as recited in claim 11, wherein said metal salt is ferric chloride.

* * * * *